United States Patent
Liu et al.

(10) Patent No.: US 8,102,819 B2
(45) Date of Patent: Jan. 24, 2012

(54) METHOD OF PAGING AND LATE-ENTRY AFTER ESTABLISHING GROUP CALL

(75) Inventors: Xuemin Liu, Shenzhen (CN); Yanye Chen, Shenzhen (CN); Xiaoxia Hou, Shenzhen (CN)

(73) Assignee: ZTE Corporation, Shenzen, Guangdong Province (CN)

( * ) Notice: Subject to any disclaimer, the term of this patent is extended or adjusted under 35 U.S.C. 154(b) by 841 days.

(21) Appl. No.: 12/130,069

(22) Filed: May 30, 2008

(65) Prior Publication Data
US 2008/0287146 A1   Nov. 20, 2008

Related U.S. Application Data

(63) Continuation-in-part of application No. PCT/CN2005/002071, filed on Dec. 2, 2005.

(51) Int. Cl.
*H04J 3/00* (2006.01)
(52) U.S. Cl. ......... 370/335; 370/312; 455/458; 455/518
(58) Field of Classification Search ................. 370/335, 370/312, 479; 455/458, 519, 520
See application file for complete search history.

(56) References Cited

U.S. PATENT DOCUMENTS

| | | | |
|---|---|---|---|
| 6,275,708 B1 | 8/2001 | Lahtinen | |
| 6,519,239 B1 * | 2/2003 | Panchal et al. | 370/335 |
| 2002/0119792 A1 | 8/2002 | Silvestri | |
| 2003/0008657 A1 | 1/2003 | Rosen et al. | |
| 2003/0153340 A1 | 8/2003 | Crockett et al. | |
| 2003/0186716 A1 * | 10/2003 | Dorenbosch et al. | 455/519 |
| 2004/0082352 A1 | 4/2004 | Keating et al. | |
| 2005/0009547 A1 | 1/2005 | Harris et al. | |

FOREIGN PATENT DOCUMENTS

| | | |
|---|---|---|
| CN | 1549626 | 7/2006 |
| EP | 1 357 765 A2 | 10/2003 |
| JP | 2003324775 | 11/2003 |

OTHER PUBLICATIONS

Office Action issued for China patent application based on PCT/CN2005/002071. May 4, 2010.

(Continued)

*Primary Examiner* — Phuoc Doan
(74) *Attorney, Agent, or Firm* — Thomas, Kayden, Horstemeyer & Risley, LLP

(57) ABSTRACT

The present invention discloses a method for Late-Entry in CDMA or other trunking systems. The method includes the following steps: after a group call is established, the base station checks the load condition of the paging channel, and if the load on the paging channel is relatively light, then the base station sends paging message carrying channel resource, and the terminal directly establishes the corresponding channel and the call is accessed through the matching for group identifier address after it receives the paging message; otherwise, the base station sends the paging message not carrying channel resource, and sends the message carrying channel resource after it receives the response message from the terminal, and then the terminal establishes the corresponding channel based on the resource information in said message and the call is accessed. By employing the method of the present invention, the load on the paging channel is alleviated and the access speed of the terminal is guaranteed.

10 Claims, 2 Drawing Sheets

OTHER PUBLICATIONS

3GPP TR 23.846 v. 6.1.0 (Dec. 2002). 3rd Generation Partnership Project; Technical Specification Group Services and System Aspects; Multimedia Broadcast/Multicast Service (MBMS); Architecture and functional description (Release 6). pp. 15, 34 and 35.

"Digital Cellular Telecommunications System (Phase 2+); Voice Group Call Service (VGCS); Stage 2 (3GPP TS 43.068 version 6.6.0 Release 6); ETSI TS 143 068", ETSI Standards, Lis, Sophia Antipolis Cedex, France, vol. 3-CN1, No. V6.6.0, Sep. 1, 2005, paragraphs 4.2.1 and 11.3.1.3.

OMA Open Mobile Alliance: "Push to Talk over Cellular (PoC)—Architecture Draft Version 1.0 Open Mobile Alliance OMA-AD_PoC-V1_0-20041117-D", Internet Citation, Nov. 17, 2004, paragraphs 9.6 and 9.7.

European Search Report for European Patent Application based on PCT/CN2005002071, Mar. 23, 2011.

\* cited by examiner

METHOD OF PAGING AND LATE-ENTRY AFTER ESTABLISHING GROUP CALL

TECHNICAL FIELD

The present invention relates to group call in trunking system, and more specifically to a method of paging and Late-Entry after a group call is established.

TECHNICAL BACKGROUND

Access speed needs to be fast in a trunking system due to the system's special usages and application sites. Since the paging mode of the traditional CDMA system takes a relatively long time in performing the processes of paging, paging response, then channel assignment, and acquisition, the access speed can not meet the requirement of trunking application. Moreover, the paging of the traditional CDMA system is performed according to the IMSI address, therefore one paging message can only page one terminal, which means serial processing is adopted by the paging terminal. Thus for a group with a lot of users, the time for access would be very long and the requirement for rapid access by the trunking system can not be met. Consequently, only one paging message is needed to page all terminals of the group because all terminals in the group match GID paging address when the Grouping Identifier (GID) paging is applied, and the channel resource is directly carried in the paging message and sent to the terminal while paging the terminals, which largely saves the time for calling and speeds up the access of the terminals.

Grouping calling is usually limited by dispatching area, namely a certain group can call just in a special area (such as an area including several geographically connected cells), and the terminal is not offered with the group call of said group outside the dispatching area. Therefore, the paging message carrying channel resource does not need to be sent in a large area and will not have an impact on the whole system network. In other words, the paging message carrying channel resource is limited to be sent in the given dispatching area, which makes carrying channel resource while paging the terminals possible. For example, a terminal originates a group call, and the paging message carrying channel resource is sent to all cells (always much smaller than the paging area of ordinary CDMA) in the dispatching area of the group, and after the paging message is received by all the group terminals in the dispatching area, the corresponding channel resource is established and the call is accessed.

The above method can realize rapid access of the terminals and is applied in the present CDMA trunking system.

Furthermore, in order to realize the Late-Entry of the terminals, including the terminals switching from power off to power on in the dispatching area and from non-dispatching area to dispatching area, and the re-accesses of the terminals due to an abnormal call drop, the base station side needs to non-periodically or periodically resend the paging message considering that the dispatching system can not monitor the condition of the terminals without accessing the system in real time. The usual solution is that the base station periodically sends the paging message until the calling ends in the process of a group call. Therefore, no matter in which condition, the terminals can receive the paging message in the dispatching area, and based on the received message, it establishes the channel resource and accesses the system with delay.

In the dispatching area, however, if the number of group calls, or the call amount of other services such as voice, data is relatively large, periodically or non-periodically sending the paging message carrying channel resource to realize the Late-Entry of the terminals is a heavy burden for the channel sending paging message, and even may affect the usability of the paging channel, which is a disadvantage of the present paging mode.

To sum up, we need to find a method which can alleviate the impact on the paging channel by the message on the premise that the Late-Entry of the terminals can be met and the normal use of all services is guaranteed.

SUMMARY OF THE INVENTION

The technical problem to be solved by the present invention is to offer a method of paging and Late-Entry after a group call is established.

Considering quick access, the base station sends the paging message carrying channel resource, and the terminal directly establishes the corresponding channel and the call is accessed through the matching for group identifier address after it receives said paging message.

Considering load of paging channel, the base station sends the paging message not carrying channel resource, then sends a message carrying channel resource to the terminals after it receives the response message from the terminal, and the terminal establishes the corresponding channel according to the resource information in the message and the call is accessed.

In order to r alleviates the load of the paging channel while the access speed of the terminals is guaranteed, the present invention offers a method of paging and Late-Entry after a group call is established, including the following steps:

(a) after a group call is established, the base station checks the load condition of the paging channel, and if the load of the paging channel is relatively light, step (b) is performed, otherwise step (c) is performed;

(b) the base station sends the paging message carrying channel resource, and the terminal directly establishes the corresponding channel and the call is accessed through the matching for group identifier address after it receives said paging message, ending;

(c) the base station sends the paging message not carrying channel resource, then sends a message carrying channel resource to the terminals after it receives the response message from the terminal, and the terminal establishes the corresponding channel according to the resource information in the message and the call is accessed, ending.

Furthermore, the above method may have the following feature: further including the following process of the terminal initiating the delayed active access:

(d1) after said group is established, the terminal originates the delayed active access and originates a group call by sending an originating call message to the base station;

(d2) if the dispatching system or the base station system judges that the group is in calling, the base station sends the paging message carrying channel resource;

(d3) said terminal establishes the corresponding channel according to the resource information in said paging message and realizes the communication with the base station.

Furthermore, the above method may have the following feature: said step (c) further including the following steps:

(c1) the base station periodically sends the paging message not carrying the channel resource of the group call;

(c2) after the terminal receives said paging message, it judges if the group identifier address of the paging message matches the terminal, if yes, the terminal returns the paging response message of the group, and step (c3) is performed, otherwise the paging message is discarded, ending;

(c3) after the base station receives the paging response from the terminal, it sends the paging message carrying channel resource to the terminal;

(c4) the terminal establishes the corresponding channel according to the resource information in the paging message and realizes the communication with the base station.

Furthermore, the above method may also have the following feature: said paging message not carrying channel resource includes the paging address list of one or more groups existing in the dispatching area, and after said terminal receives the paging message, it matches the paging message with the paging addresses in the list and returns a response message if a paging address is matched.

Furthermore, the above method may also have the following feature: said paging address list includes the number of enabled groups in said dispatching area, the byte-length of the paging address and the list of the group identifier address.

Furthermore, the above method may also have the following feature: the base station periodically sends the paging message.

Furthermore, the above method may also have the following feature: in said step (a), the base station directly sends a paging message not carrying the resource message without checking the load condition of the paging channel, and sends the message not carrying channel resource to the terminal after it receives the response message from the terminal, and the terminal establishes the corresponding channel according to the resource information in the message and the call is accessed.

The present invention also offers a method of paging and Late-Entry after a group call is established, including the following steps: after a group call is established, the base station sends the paging message not carrying resource information, and sends the message not carrying channel resource to the terminal after it receives the response message from the terminal, and the terminal establishes the corresponding channel according to the resource information in the message and the call is accessed.

Furthermore, the above method may also have the following feature: said paging message not carrying channel resource includes the paging address list of one or more groups existing in the dispatching area, and after said terminal receives the paging message, it matches the paging message with the paging addresses in the list and returns a response message if a paging address is matched.

Furthermore, the above method may also have the following feature: said paging address list includes the number of enabled groups in said dispatching area, the byte-length of the paging address and the list of the group identifier address.

Furthermore, the above method may also have the following feature: the base station periodically sends the paging message.

By applying the method of the present invention, the rapid access of the terminal in CDMA or other trunking systems can be realized and the load of the paging channel of the base station system can be alleviated.

PREFERRED EMBODIMENT OF THE INVENTION

The present invention will be described in further detail with reference to the accompanying figures and the embodiments.

The present embodiment will take CDMA trunking system as example, but the method of the present invention is not limited to applications in CDMA trunking system. In the accompanying figures, PDS is a trunking dispatching subsystem which is responsible for the management and dispatching of the group calls, BS is CDMA base station system and MS is mobile subscriber. In light of the characteristic of the group call, the terminals are divided into two categories: one talking subscriber terminal (MS_T) and several listening subscriber terminals (MS_L*, * means several), the channels used by the talking subscriber terminal and the listening subscriber terminals are different.

Figure 1:
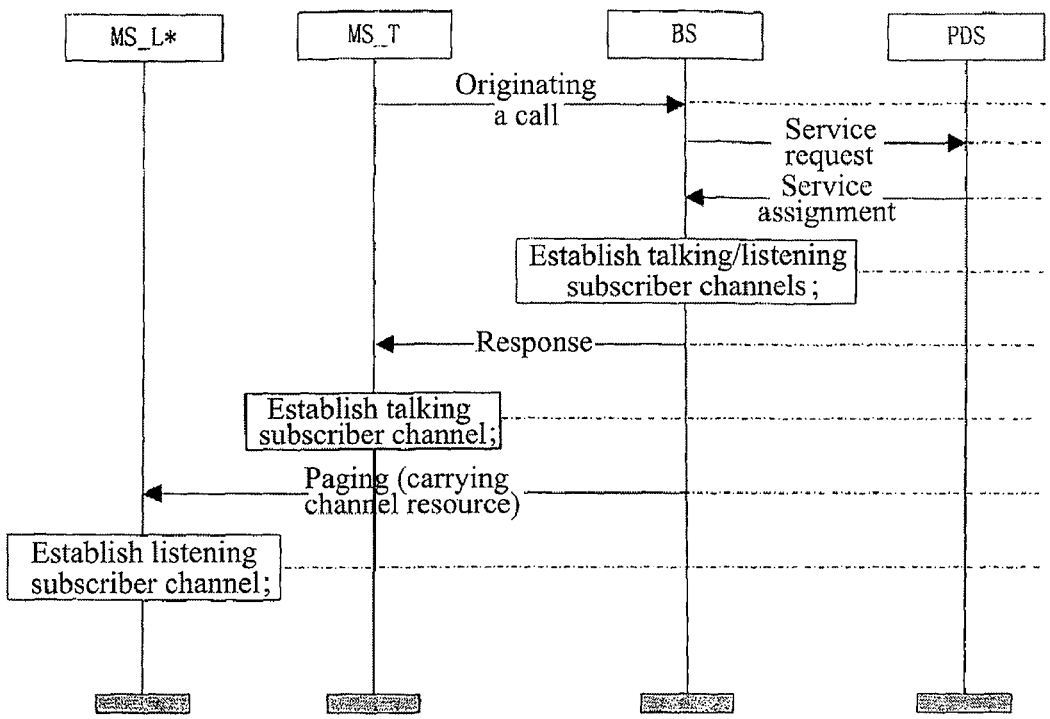
FIG. 1 is a flow chart of originating call and paging of a group call, wherein the paging message carries the channel resource.

FIG. 1 shows the flow of originating call and paging during the establishment of a group call, which includes the following steps:

Step 1.a, a certain terminal MS_T originates a group call;

Step 1.b, after the BS (base station) receives an origination message from the terminal, it sends a service request message to the dispatching subsystem, PDS;

Step 1.c, the PDS performs service assignment and a new call is assigned;

Step 1.d, the BS establishes the corresponding channel resource, including the channels of the talking subscriber and the listening subscribers according to the resource assignment;

Step 1.e, the BS sends a response message of originating call to the terminal MS_T and sends the channel resource message of the saying subscriber to the terminal;

Step 1.f, the terminal MS_T establishes the corresponding channel according to the resource information and realizes the communication with the base station;

Step 1.g, at the same time of sending the response of originating call, the BS sends a paging message carrying the channel resource information of the listening subscribers to MS_L*;

Step 1.h, the MS_L* terminals establish the corresponding channels according to the resource information and realize the communication with the base station.

The establishment of the above group call is the same as the prior art.

The processes of paging and Late-Entry after the establishment of the group call include the following steps:

Step 1, based on the load condition of the paging channel, the BS judges if the paging message carries the channel resource, if the load of the paging channel is relatively small, the paging message carries the channel resource, then step 2 is performed, otherwise step 3 is performed;

Specifically, a threshold can be set for the judgment, and the load is considered to be relatively small when the load is smaller than the threshold and considered to be relatively large otherwise. Alternatively, several parameters can be weighted for the judgment.

Figure 2:
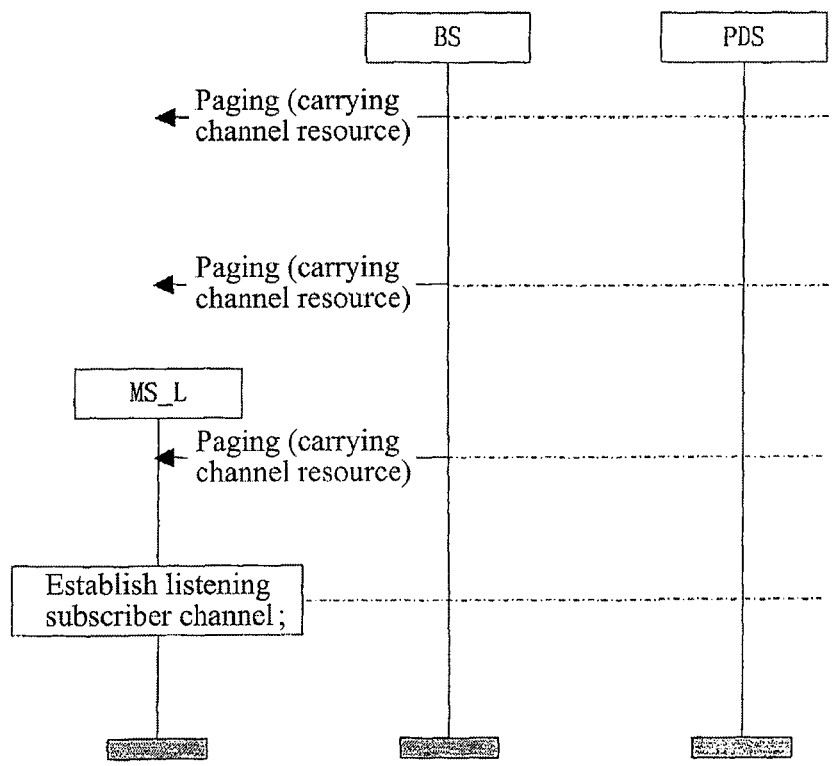
FIG. 2 is a flow chart of Late-Entry of a paging message carrying channel resource in accordance with an embodiment of the present invention.

Step 2, the processes of Late-Entry when the paging message carries the channel resource are as shown in FIG. 2, including the following steps:

Step A, the BS periodically sends a paging message carrying the channel resource of the group call;

Step B, if a certain MS_L is switched on in the dispatching area or enters into the dispatching area from another area, or the system is re-locked after an abnormal call drop and a periodical paging message is received from the BS, then the next step is performed;

Step C, the terminal judges whether the GID address of the paging message matches the terminal, if yes, a corresponding channel is established according to the resource information and the communication with the base station is realized, otherwise the paging message is discarded.

Figure 3:
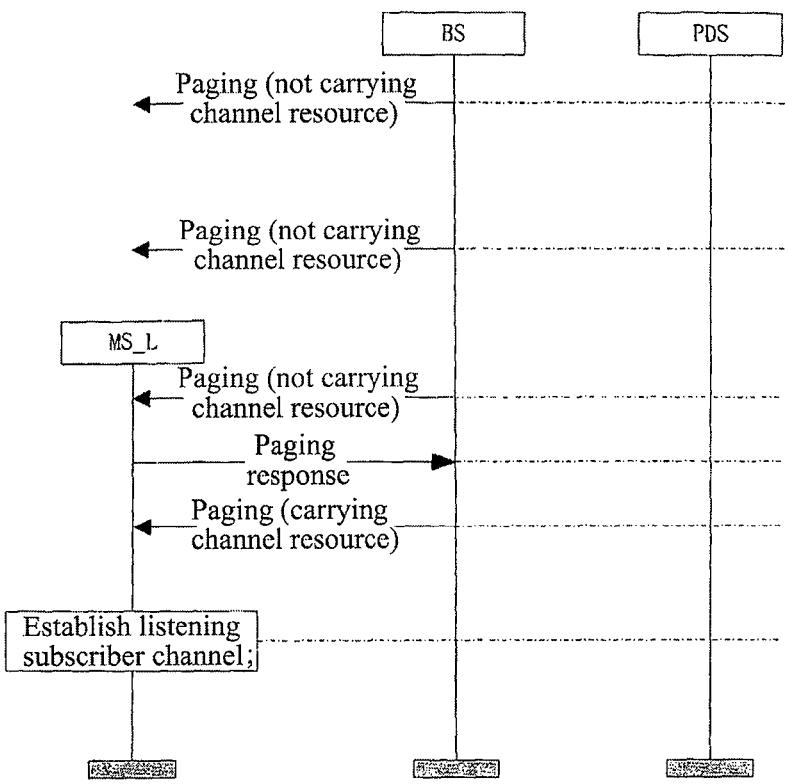
FIG. 3 is a flow chart of Late-Entry of a paging message not carrying channel resource in accordance with an embodiment of the present invention.

Step 3, the processes of Late-Entry when the paging message does not carry the channel resource are as shown in FIG. 3, including the following steps:

Step D, the BS periodically sends a paging message not carrying the channel resource of the group call;

Step E, if a certain MS_L is switched on in the dispatching area or enters into the dispatching area from another area, or the system is re-locked after an abnormal call drop and a periodical paging message is received from the BS, then the next step is performed;

Step F, the terminal MS_judges whether the GID address of the paging message matches the terminal, if yes, the terminal returns a paging response message of the group, and the next step is performed, otherwise the paging message is discarded, and ending.

Step G, after the BS receives the paging response from the terminal, it sends the paging message carrying channel resource to the terminal;

Step H, the MS_L establishes the corresponding channel according to the resource information in the paging message and realizes the communication with the base station.

Figure 4:
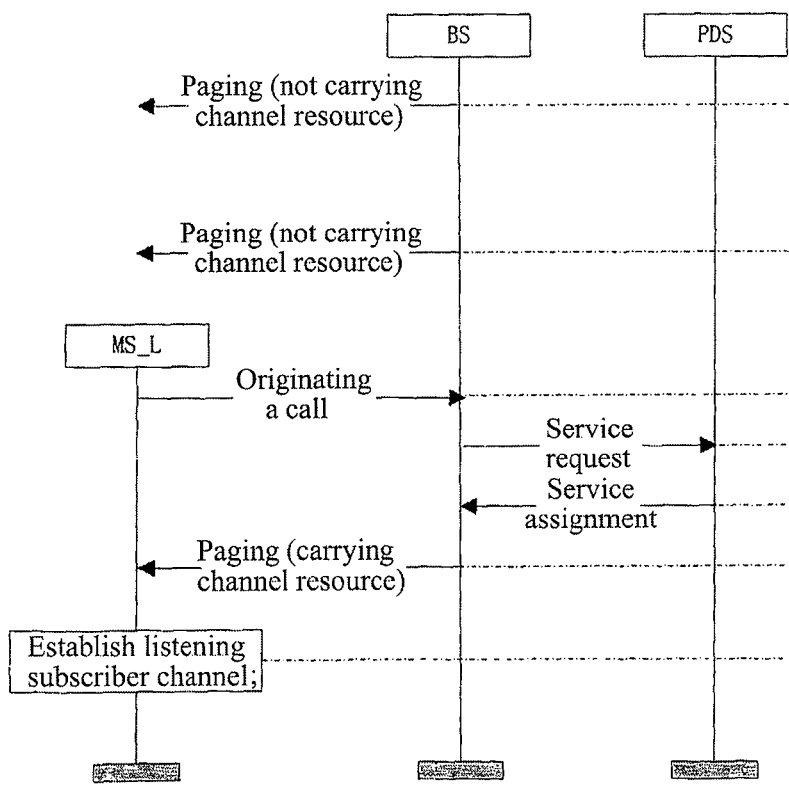
FIG. 4 is a flow chart of delayed active access in accordance with an embodiment of the present invention.

During the process of the group call, if there is a terminal originating a delayed active access before it receives a paging message, then the flow includes the following steps as shown in FIG. 4:

Step I, a certain terminal MS_T sends an originating call message to the BS to originate a group call;

Step J, after the BS receives an origination message from the terminal, it sends a service request message to the dispatching subsystem, PDS;

Step K, the PDS performs a service assignment and an existing call is assigned;

Step L, the BS sends the paging message carrying the channel resource information of the listening subscribers of the group call to the terminal;

Step M, the terminal MS_T establishes the corresponding channel according to the resource information in the paging message and realizes the communication with the BS.

For the paging message not carrying channel resource, since the message has no special information of the group except of the paging address (constructed by the GID), the paging addresses of one group or several groups existing in the dispatching area can be combined together to form an address list (in the address layer), which is shown as the following table:

| Name | The length of the field (bits) |
|---|---|
| NUM_ADDRESS | 4 |
| ADDR_LENGTH | 4 |
| GID_ADDR_LIST | NUM_ADDRESS* ADDR_LENGTH*8 |

In the table, NUM_ADDRESS indicates the number of enabled groups in the cell, ADDR_LENGTH denotes the byte-length of the paging address and GID_ADDR_LIST is a GID address list. The terminal receives the paging message and matches it with all group addresses in the GID_ADDR_LIST and responds to the matched group.

By employing the above address list, only one paging message including the address list, rather than several messages, is sent to each terminal for several group calls included in the address list in one paging period, therefore, the load of the paging channel is alleviated in a certain extent.

To sum up, the present invention realizes the paging and Late-Entry of the terminals in the mechanism of totally shared channel when the GID paging method is applied in trunking systems, which meets the requirement for group call with large capacity considering the load of the paging channel, and guarantees the rapid access.

Industrial Applicability

The method according to the present invention can alleviate the load of the paging channel while the access speed of the terminal is guaranteed in CDMA or other trunking systems.

What we claim is:

1. A method of paging and Late-Entry after a group call is established, the base station sending a paging message not carrying channel resource, then sending a message carrying channel resource to the terminal after receiving a response message from the terminal, and the terminal establishing a corresponding channel according to the resource information in the message and the call being accessed wherein, the method further includes the following process of the terminal initiating delayed active access;

the base station periodically sending a paging message not carrying the channel resource of the group call;

the terminal judging if the group identifier address of the paging message matches the terminal after receiving said paging message, if yes, the terminal returning a paging response message of the group, and step i being performed, otherwise discarding the paging message, ending;

step i: the base station sending a paging message carrying channel resource to the terminal after receiving the paging response from the terminal;

step ii: the terminal establishing the corresponding channel according to the resource information in the paging message and realizing communication with the base station.

2. The method of claim 1, which further includes the following process of the terminal initiating delayed active access:

(d1) the terminal originating delayed active access after said group having been established, and originating a group call by sending an origination message to the base station;

(d2) if a dispatching system or base station system judges that the group is in calling, the base station sending a paging message carrying channel resource;

(d3) said terminal establishing a corresponding channel according to the resource information in said paging message and realizing communication with the base station.

3. The method of claim 1, wherein said paging message not carrying channel resource includes a paging address list of one or more groups existing in a dispatching area;

after said terminal receives the paging message, it matches the paging message with the paging addresses in the list and returns a response message if a paging address is matched.

4. The method of claim 3, wherein said paging address list includes a number of enabled groups in said dispatching area, byte-length of the paging address and the list of group identifier address.

5. A method of paging and Late-Entry after a group call is established, including the following steps of:
   (a) a base station checking load condition of a paging channel after a group call is established, and if the load of the paging channel being relatively light, step (b) being performed, otherwise step (c) being performed;
   (b) the base station sending a paging message carrying channel resource, a terminal directly establishing a corresponding channel and the call being accessed through matching of group identifier address after receiving said paging message, ending; and
   (c) the base station sending a paging message not carrying channel resource, then sending a message carrying channel resource to the terminal after receiving a response message from the terminal, and the terminal establishing a corresponding channel according to the resource information in the message and the call being accessed, ending.

6. The method of claim 5, which further includes the following process of the terminal initiating delayed active access:
   (d1) the terminal originating delayed active access after said group having been established, and originating a group call by sending an origination message to the base station;
   (d2) if a dispatching system or base station system judges that the group is in calling, the base station sending a paging message carrying channel resource;
   (d3) said terminal establishing a corresponding channel according to the resource information in said paging message and realizing communication with the base station.

7. The method of claim 5, wherein said step (c) further includes the following steps of:
   (c1) the base station periodically sending a paging message not carrying the channel resource of the group call;
   (c2) the terminal judging if the group identifier address of the paging message matches the terminal after receiving said paging message, if yes, the terminal returning a paging response message of the group, and step (c3) being performed, otherwise discarding the paging message, ending;
   (c3) the base station sending a paging message carrying channel resource to the terminal after receiving the paging response from the terminal;
   (c4) the terminal establishing the corresponding channel according to the resource information in the paging message and realizing communication with the base station.

8. The method of claim 5, wherein said paging message not carrying channel resource includes a paging address list of one or more groups existing in a dispatching area;
   after said terminal receives the paging message, it matches the paging message with the paging addresses in the list and returns a response message if a paging address is matched.

9. The method of claim 8, wherein said paging address list includes a number of enabled groups in said dispatching area, byte-length of the paging address and the list of the group identifier address.

10. The method of claim 5, wherein the base station periodically sends the paging message.

* * * * *